United States Patent
Robert

(10) Patent No.: US 11,972,705 B1
(45) Date of Patent: Apr. 30, 2024

(54) ELECTRONIC DISPLAY BOARD

(71) Applicant: Daniel J. Robert, Holyoke, MA (US)

(72) Inventor: Daniel J. Robert, Holyoke, MA (US)

(*) Notice: Subject to any disclaimer, the term of this patent is extended or adjusted under 35 U.S.C. 154(b) by 0 days.

(21) Appl. No.: 17/989,973

(22) Filed: Nov. 18, 2022

(51) Int. Cl.
| | | |
|---|---|---|
| *G06F 7/00* | (2006.01) | |
| *G06F 1/16* | (2006.01) | |
| *G06F 3/02* | (2006.01) | |
| *G09F 9/33* | (2006.01) | |
| *G09F 9/35* | (2006.01) | |
| *G09F 13/22* | (2006.01) | |
| *G09G 3/36* | (2006.01) | |
| *B60Q 1/50* | (2006.01) | |

(52) U.S. Cl.
CPC .............. *G09F 9/35* (2013.01); *G06F 1/1601* (2013.01); *G06F 3/0202* (2013.01); *G09F 9/335* (2021.05); *G09F 13/22* (2013.01); *G09G 3/36* (2013.01); *B60Q 1/5035* (2022.05)

(58) Field of Classification Search
CPC .................................................. G06F 3/04883
See application file for complete search history.

(56) References Cited

U.S. PATENT DOCUMENTS

| | | | |
|---|---|---|---|
| 7,020,992 B1 | 4/2006 | Christie | |
| 8,558,756 B2 | 10/2013 | Stevens et al. | |
| 8,875,426 B2 | 11/2014 | Wagner | |
| 9,734,744 B1 | 8/2017 | McGie | |
| 10,602,331 B2 | 3/2020 | Takii et al. | |
| 10,829,038 B1 | 11/2020 | Lara Contreras et al. | |
| 10,836,324 B2 | 11/2020 | Jung | |
| 2003/0038896 A1* | 2/2003 | Kang | G06F 3/0227 345/531 |
| 2006/0075934 A1* | 4/2006 | Ram | G06F 9/4416 108/44 |
| 2011/0137521 A1* | 6/2011 | Levi | B60N 2/002 701/36 |
| 2013/0328751 A1* | 12/2013 | Coleman | G09F 13/22 345/76 |
| 2015/0054660 A1* | 2/2015 | Simmons | G09F 9/30 340/908 |
| 2015/0070839 A1* | 3/2015 | Johnson | F16M 11/10 248/205.6 |
| 2017/0278434 A1* | 9/2017 | Pollard | G09F 7/10 |
| 2018/0329625 A1* | 11/2018 | Griffin | G06F 3/04886 |

* cited by examiner

*Primary Examiner* — Nan-Ying Yang
(74) *Attorney, Agent, or Firm* — Cramer Patent & Design PLLC; Aaron R. Cramer

(57) ABSTRACT

An Electronic Display Board for an automobile has a programmable display capable of being removable secured to an interior surface of an automobile. The angle of the frame may be adjusted by a mounting frame having a plurality of securable positions.

1 Claim, 4 Drawing Sheets

ELECTRONIC DISPLAY BOARD

RELATED APPLICATIONS

Non-applicable.

FIELD OF THE INVENTION

The presently disclosed subject matter is directed to a display board and more specifically to an electronic display board.

BACKGROUND OF THE INVENTION

In today's society, courteous driving is becoming a rarity. In fact, incidents of violence among motorists, known as "road rage," are rising to levels where it is not uncommon to hear that gunshots are exchanged, and people are killed in response to something as trivial as driving too slowly. Much of this aggressive action may be attributed to the impersonal nature of driving and the inability to easily communicate with other drivers. Drivers tend to think of other vehicles as motor vehicles that are simply in their way and not as people.

One method of perhaps decreasing this impersonal atmosphere is by the use of a quick wave when a fellow motorist allows a driver to merge on a highway or pull out on a busy street. However, the wave may be missed, or be interpreted as an obscene gesture. Accordingly, the need has developed for a means by which a motorist can show appreciation, show concern, pass safety messages and the like, to other drivers in a unique method that is quick, easy, and effective. The development of the electronic display board fulfills this need.

SUMMARY OF THE INVENTION

The present invention provides for a digital message display device having a digital display contained within a frame, an outer brace and an inner brace attached to the frame, the frame is adapted to be angularly adjusted to be supported on a planar surface, a power cord adapted to provide electrical power from a power source, and a miniature keyboard serving as a programming device that produces a message displayed on the digital display.

The digital display may be an LCD display. The LCD display may include a twisted nematic style. The message displayed on the digital display may be one or more digital text messages. The digital display may be selected from the group consisting of an IPS digital display, an OLED digital display, or an AFFS digital display. The digital display may be 8 inches tall and 12 inches wide. The digital display may be 18 inches tall and 36 inches wide.

A space between the digital display and the frame may be utilized for an additional message. The space between the digital display and the frame may be utilized for one or more logos. The frame may include at least 6 suction cups arranged in a symmetrical orientation about an upper portion and a lower portion of the frame. The at least 6 suction cups may be arranged in a near vertical orientation. The digital message display device may be adapted to be attached to an inner surface of a window using the inner brace, the outer brace, the frame, and the at least 6 suction cups.

The inner brace, the outer brace, and the frame may be adjustable to allow the digital display to remain vertical to facilitate readability by one or more other motorists or by one or more passersby. The digital message display device may be adapted to be secured to the inner surface of the window using the at least 6 suction cups attached to the frame. The power source may be selected from the group consisting of a 12.0-VDC connection that is hardwired to a fuse box in a motor vehicle, a temporary 12.0-VDC connection via a cigarette lighter, a 120-VAC outlet via a 12.0-VDC wall adapter, or a photovoltaic power panel. The miniature keyboard may include a microphone that allows for voice control to produce the message on the digital display where use of the miniature keyboard is not possible or difficult. The miniature keyboard may be connected to the digital display by a cable that terminates in a connection jack. The connection jack may allow the miniature keyboard to be disconnected after programming the digital display to prevent tampering, unauthorized use, and entanglement of the cable. The inner brace may be attached to each side of a vertical portion of the frame located at a midpoint thereof. Each of the inner braces may be a curvilinear resilient, rigid, and unitary fabricated member.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
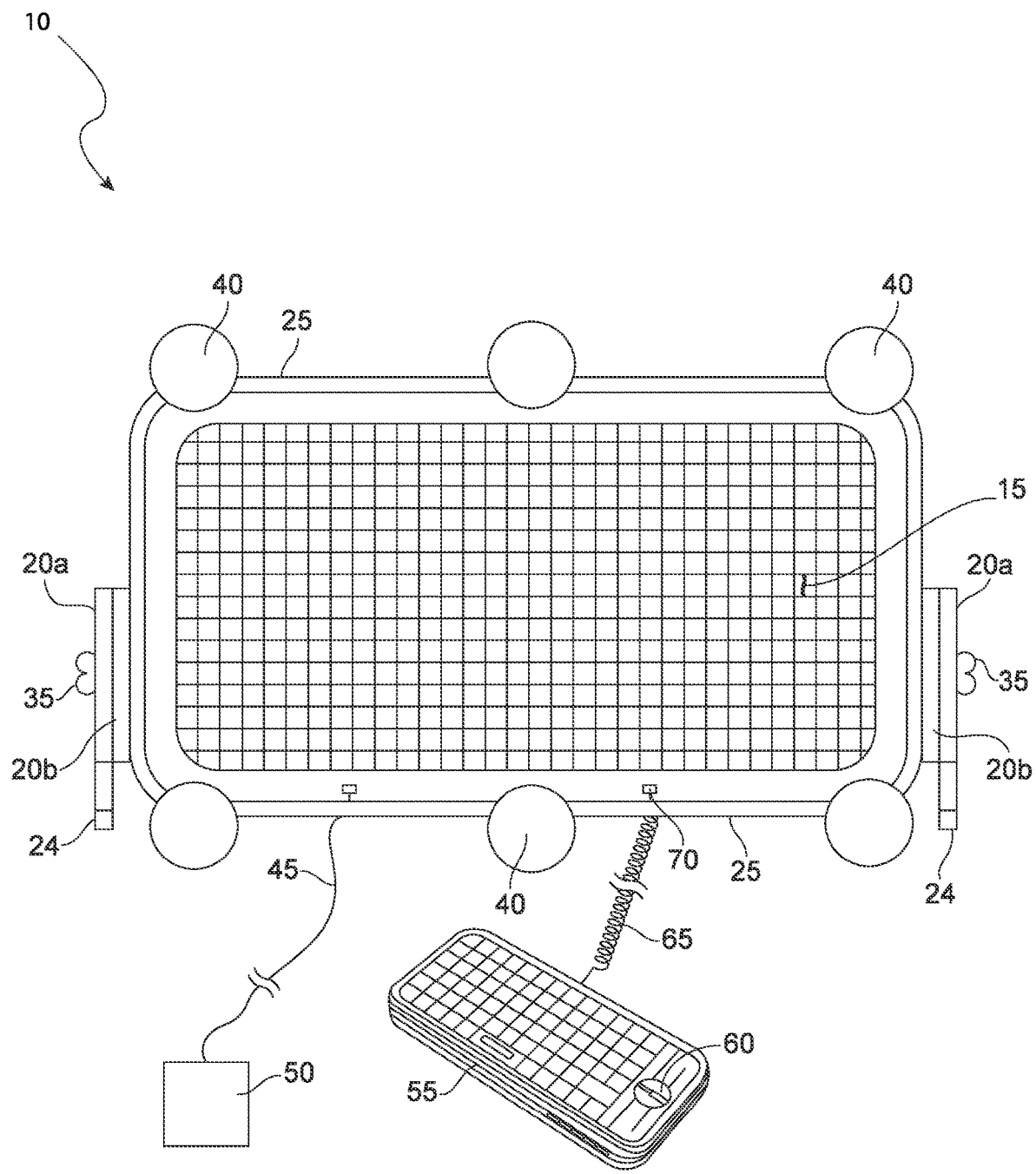
FIG. 1 is a front view of the digital message display device, according to the preferred embodiment of the present invention.

DESCRIPTIVE KEY 10 digital message display device
15 digital display
16 message
20a outer brace
20b inner brace
21a slot
21b inner brace fastener
22a outer brace fastener
22b aperture
24 pad
25 frame
30 planar surface
35 hardware fastener
40 suction cup
45 power cord 50 power source
55 miniature keyboard
60 microphone
65 cable
70 connection jack
75 motor vehicle
80 window
85 business

DESCRIPTION OF THE PREFERRED EMBODIMENTS

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a front view of the digital message display device 10, according to the preferred embodiment of the present invention is disclosed. The digital message display device (herein also described as the "device") 10, is particularly suited for windows 80 in a motor vehicle 75 or other structure having a digital display 15 capable of displaying digital text messages 16 for purposes of providing information, courtesy, requests and to improve safety. The device 10 provides for such a digital display 15 that is contained within a frame 25. The digital display 15 is envisioned to be a liquid crystal display (LCD) display of the twisted nematic (TN) style. However, other types of digital displays 15 such as IPS, OLED, Advanced Fringe Field Switching (AFFS), and the like may also be utilized. Additionally, the size of the digital display 15 will vary per the application. Smaller versions for use such as that for a widow 80 of a motor vehicle 75 would be approximately eight inches (8 in.) tall and twelve inches (12 in.) wide. A larger version for use such as that for a window 80 of a business 85 would be approximately eighteen inches (18 in.) tall and thirty-six inches (36 in.) wide. As such, the use of any specific style or dimension of the digital screen 15 is not intended to be a limiting factor of the present invention.

The digital display 15 is surrounded around its outer perimeter with a frame 25 of a slightly larger dimension than the digital display 15 The space between the digital display 15 and the frame 25 can be utilized for message display, logos, etc. The frame 25 is joined to an outer brace 20a and inner brace 20b that can be angularly adjusted as desired to enable the device 10 to be supported on a planar surface 30.

The configuration of the outer brace 20a, inner brace 20b, and method of joining to the frame 25 allows for multiple configurations as will be further explained herein below. The inner brace 20b is a linear inner brace directly attached to the frame 25 and the outer brace 20a is a linear outer brace directly attached to the inner brace 20b on each side of the frame.

The frame 25 is provided with at least six (6) suction cups 40 arranged in a symmetrical orientation about the upper and lower portion of the frame 25. Electrical power for the device 10 is provided via a power cord 45 from a power source 50. The power source 50 is envisioned to one (1) of multiple sources including but not limited to: a twelve-volt direct current (12.0-VDC) connection that is hardwired to a fuse box in a motor vehicle; a temporary twelve-volt direct current (12.0-VDC) connection via a cigarette lighter, a one-hundred twenty volt alternating current (120-VAC) outlet via a twelve-volt direct current (12.0-VDC) wall adapter, a photovoltaic power panel (solar panel) or the like. The exact type of connection provided by the power source 50 is not intended to be a limiting factor of the present invention.

A miniature keyboard 55 is provided as the programming device that provides for the production of the message displayed on the digital display 15. Additionally, the miniature keyboard 55 provides for a microphone 60 that allows for voice control (command) of the device 10 to produce messages on the digital display 15 where use of the miniature keyboard 55 is not possible or difficult. The miniature keyboard 55 is connected to the digital display 15 by use of a cable 65 that terminates in a connection jack 70. The connection jack 70 allows the miniature keyboard 55 to be disconnected after programming the digital display 15 to prevent tampering, unauthorized use, entanglement of the cable 65, or for other reasons dependent on area of use or application. The cable 65 can be coiled.

Figure 2:
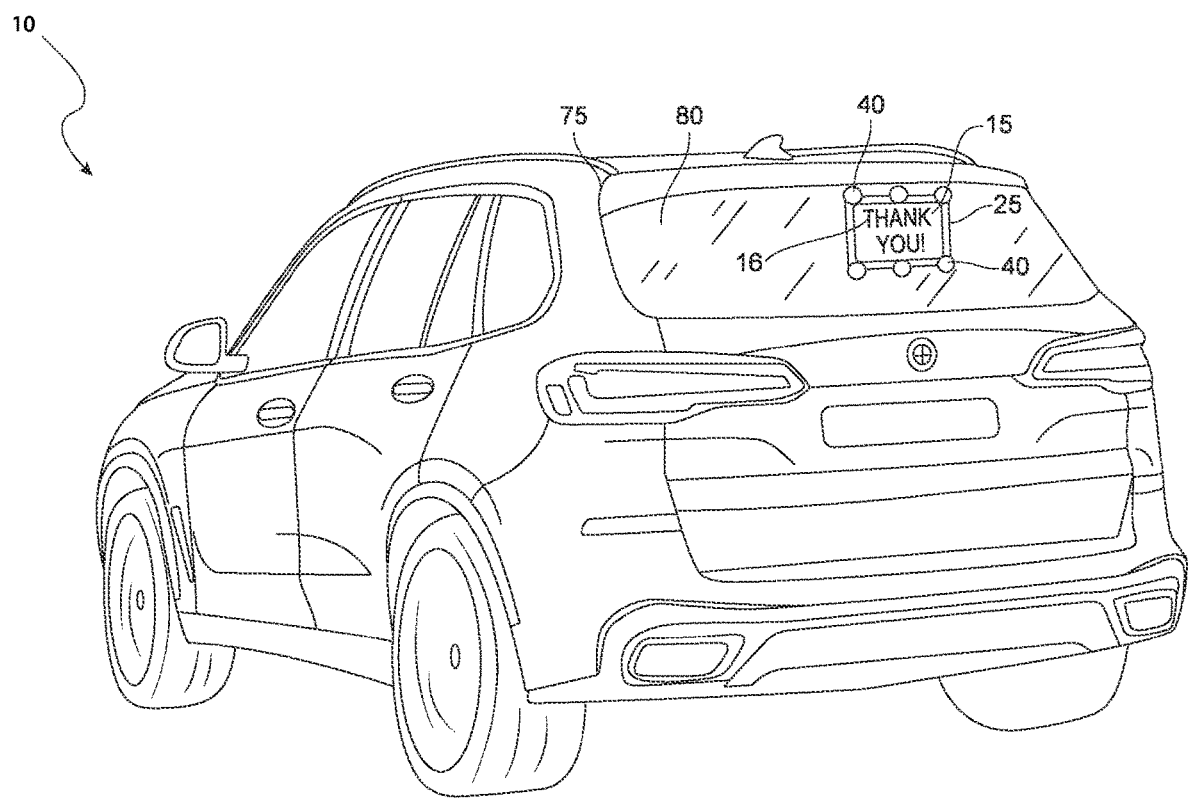
FIG. 2 is a perspective view of the digital message display device, shown in an installed state on a window of a motor vehicle, according to the preferred embodiment of the present invention.

Referring next to FIG. 2, a perspective view of the device 10, shown in an installed state on a motor vehicle 75, according to the preferred embodiment of the present invention is depicted. The device 10 is attached to the inner surface of a window 80, shown here as a rear window using the braces 20a, 20b, frame 25 and the suction cups 40. It is noted that the device 10 may be installed on any window of a motor vehicle 75, and as such, the location of the device 10 on a motor vehicle 75 is not intended to be a limiting factor of the present invention. The braces 20a, 20b and frame 25 can be adjustable to provide for an offset angle when compared to the digital display 15, thus allowing the digital display 15 to remain nearly vertical for purposes of easy readability by other motorists or passerby when the device 10 is placed on a planar surface 30. Further description of the mounting arrangement of the device 10 in a motor vehicle 75 with a non-vertical window 80.

Figure 3:
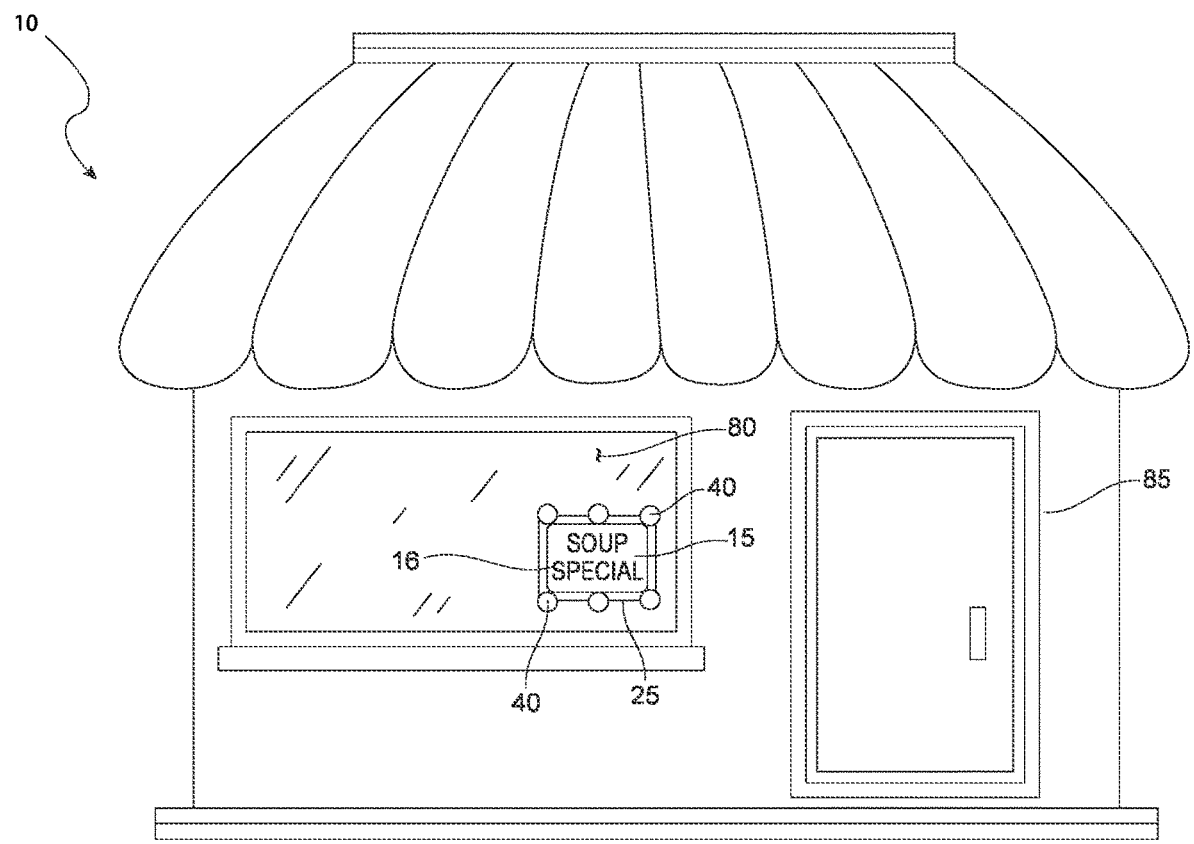
FIG. 3 is a perspective view of the digital message display device, shown in an installed state on a window of a business, according to the preferred embodiment of the present invention.

Referring now to FIG. 3, a perspective view of the device 10, shown in an installed state on a business 85, according to the preferred embodiment of the present invention is shown. The business 85 may be a retail sales location, a restaurant, institutional establishment, commercial entity, private residence, or any other location where information transfer to individuals in the area of the business 85 is desired. The device 10 is provided on the inner surface of the window 80, using the frame 25 and the suction cups 40, envisioned to be in a near vertical orientation. It is noted that the device 10 may be installed on any window of a business 85, and as such, the location of the device 10 on a business 85 is not intended to be a limiting factor of the present invention. The braces 20a, 20b (not shown) frame 25 and the frame 25 are in general alignment with one (1) another, thus allowing the digital display 15 to remain nearly vertical for purposes of easy readability by passersby. Further description of the mounting arrangement of the device 10 in a business 85 with a non-vertical window 80.

Figure 4:
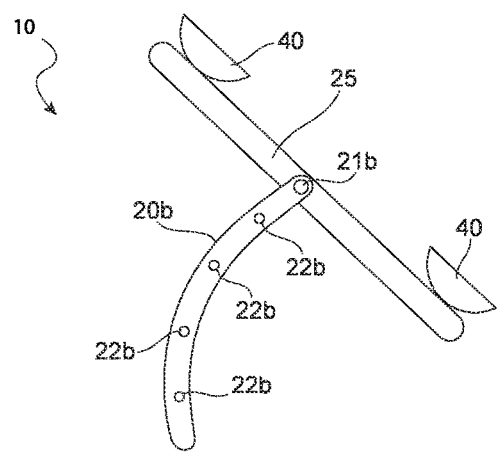
FIG. 4 is a side elevation view of the digital message display device, showing an inner brace attached to a frame, according to the preferred embodiment of the present invention.

Referring next to FIG. 4, a side elevation view of the device 10 without the outer brace 20a, according to the preferred embodiment of the present invention is disclosed. The device 10 is capable of being secured to the interior of the window 80 using the suction cups 40 as attached to the frame 25. Attached to each side of the vertical portion of the frame 25, and either located at a midpoint thereof, or at a center of gravity, is an inner brace 20b, for a total of two (2) inner braces 20b. Each inner brace 20b is a curvilinear resilient, rigid, and unitary fabricated member. A first end of the inner brace 20b is attached in a rigid or pivotal manner to the vertical portion of the frame 25 with an inner brace fastener 21b. The second end of the inner brace 20b terminates in a curved shape. A plurality of apertures 22b are spaced along the inner brace 20b, preferably along a common bisecting longitudinal center line and equidistantly spaced.

Figure 5:
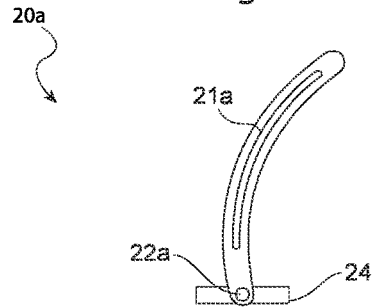
FIG. 5 is a side elevation view of an outer brace, according to the preferred embodiment of the present invention.

Referring now to FIG. 5, a side elevation view of an individual outer brace 20a, according to the preferred embodiment of the present invention is depicted. It is appreciated that the number of outer braces 20a shall preferably be equal to the number of inner braces 20b. Each outer brace 20a generally has the same overall shape and size as the inner brace 20 (i.e., a curvilinear resilient, rigid, and unitary fabricated member). An outer brace fastener 22a is located at a first end of the outer brace 20a either rigidly or pivotally attaches to a side wall of a pad 234. The pad 24 is constructed out of a deformable or protective material, or at least a portion thereof is, to enable protection of a planar surface 30 upon which it supports the device 10, and also to enable full support to the device 10. A slot 21a is formed along a bisecting centerline of the outer brace 20a and terminates prior to the first and second end thereof.

Figure 6:
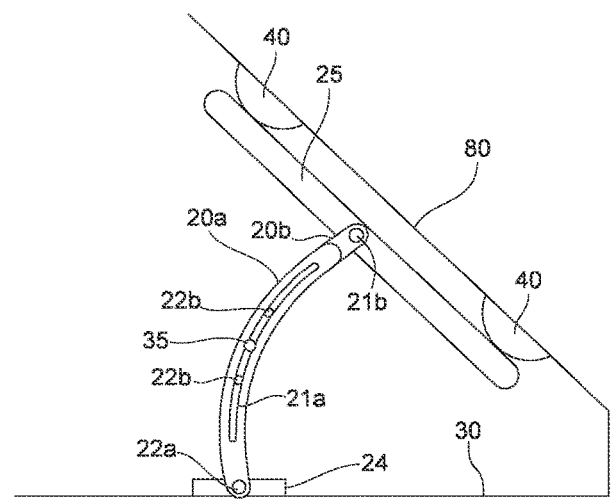
FIG. 6 is a side elevation view of the digital message display device fully installed and mounted to a window and supported on a planar surface, according to the preferred embodiment of the present invention.

Referring to FIG. 6, a side elevation view of the device 10 illustrating an intended method of use and the outer brace 20a and inner brace 20b in mechanical communication therebetween, according to the preferred embodiment of the present invention is depicted. The device 10 is secured to the interior of the window 80 using the suction cups 40 as attached to the outer frame 25. This arrangement produces the outer brace 20a, the inner brace 20b, the frame 24 and thus the digital display 15 as shown in FIG. 1) in a generally parallel arrangement to the window 80. At least one (1) hardware fastener 35 is capable of securing a relative position of the inner brace or braces 20b (and hence the frame 25 and digital display 15) to the outer brace or braces 20a by passing through the slot 22a and any of the apertures 22b. It is appreciated that the hardware fastener 35 can be a set of securing implements that can function as expected. It is also appreciated the apertures 22b can be as many or as few as desired or agglomerated into multiple or single slots similar to the slot 35 on the outer brace 20a.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 5. The user would procure the device 10 from conventional procurement channels such as automotive supply stores, discount stores, department stores, wholesale clubs, mail order and internet supply houses and the like. Special attention would be paid to the overall physical size of the digital display 15 such that it is appropriate, safe, and readable for its intended use.

After procurement and prior to utilization, the device 10 would be prepared in the following manner: the device 10 would be removed from its packaging; the suction cups 40 would be attached to the frame 25, the inner brace or braces 20b would be attached to the vertical portions of the frame 25 via an inner brace fastener 21b, if needed; the outer brace or braces 20a would be attached to the pad 24 via an outer brace fastener 22a, if needed; the suction cups 40 would be placed against the window 80 and pressure applied to hold it in place; and, the power cord 45 would be connected to a power source 50 as aforementioned described. At this point in time, the device 10 is ready for programming.

To program the text to be displayed by the digital display 15, the user would connect the miniature keyboard 55 to the digital display 15 via the cable 65 and the connection jack 70. Various text messages for subsequent display as a message 16 would be entered using either the miniature keyboard 55 or its accompanying microphone 60. Other parameters such as cyclical text messages, cycle interval times and the like, may also be entered. At this point in time, the device 10 is ready for use.

During usage on a motor vehicle 75, it is envisioned that messages 16 displayed on the digital display 15 would be: "out of gas"; "mechanical breakdown"; information on not to tow away; medical emergencies; military information (especially military police); and information on ride sharing services, religious quotes, political endorsements, and the like.

During usage on a business 85, it is envisioned that messages 16 displayed on the digital screen 15 would be: security in advertising; daily specials; handicapped access information; food truck marketing; means of communication between distances; store front advertising; and promotion of products.

Overall usage of the features of the digital display 15 is envisioned to provide the following benefits: allows messages 16 to change quickly; helps with traffic; lessens road rage; clear identification of personal information; lessens confusion; increases safety; improves productivity; requests help in summoning emergency assistance; and, providing quick identification of those needing help.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A digital message display device adapted for versatile mounting and display of digital text messages on a variety of planar surfaces, comprising:

a rectangular LCD digital display measuring either 8 inches by 12 inches for motor vehicle application or 18 inches by 36 inches for business window application, enclosed within a frame featuring at least six symmetrical suction cups for mounting;

a twisted nematic style LCD, with the option for IPS, OLED, or AFFS digital displays, to cater to diverse visibility requirements;

a dual brace system including a linear inner brace attached directly to the midpoint of the frame's vertical portion and a linear outer brace attached directly to the inner brace, both braces being curvilinear, resilient, rigid, and unitary, facilitating angular adjustment of the frame to maintain the display vertical for readability;

a power cord compatible with multiple power sources including a 12.0-VDC connection hardwired to a motor vehicle's fuse box, a temporary 12.0-VDC connection via a cigarette lighter, a 120-V AC outlet via a 12.0-VDC wall adapter, or a photovoltaic power panel, ensuring versatility in power supply; and, a miniature keyboard connected to the display by a cable terminating in a detachable connection jack for message programming, featuring a microphone for voice-controlled input where manual operation is challenging, enhancing ease of message update and securing against unauthorized modifications; and, wherein the device is specifically designed for attachment to the inner surface of a window using the braces, frame, and suction cups, with the frame and braces adjustable to ensure the display remains vertical, optimizing visibility to motorists and passersby; and, wherein the device's installation and operation are facilitated by a configuration that allows for quick message changes, supports traffic management, enhances safety, and promotes effective communication in various contexts including motor vehicle emergencies and business advertising.

\* \* \* \* \*